Oct. 23, 1923.

S. J. CLULEE 1,472,014

TEMPLE BAR CONSTRUCTION

Filed Nov. 28, 1922

Inventor
STEPHEN J. CLULEE.
By his Attorney
Robert S. Blair

Patented Oct. 23, 1923.

1,472,014

UNITED STATES PATENT OFFICE.

STEPHEN J. CLULEE, OF ATTLEBORO, MASSACHUSETTS.

TEMPLE-BAR CONSTRUCTION.

Application filed November 23, 1922. Serial No. 603,778.

*To all whom it may concern:*

Be it known that I, STEPHEN J. CLULEE, a citizen of the United States, and a resident of Attleboro, in the county of Bristol and State of Massachusetts, have invented an Improvement in Temple-Bar Construction, of which the following is a specification.

This invention relates to eyeglass construction, particularly to that of the non-metallic type, and more particularly to the construction of temple bars for eyeglasses.

One of the objects of this invention is to provide in non-metallic eyeglass construction, a non-metallic temple bar for holding the eye glasses or eyeglass frame in proper position with respect to the eyes that will be of simple and practical construction, yet durable and rugged, to meet the conditions of practical use. Another object is to provide a construction for non-metallic temple bars that will be of convenient application and of great comfort when in use, as well as of neat appearance. Other objects will be in part obvious or in part pointed out hereinafter.

The invention accordingly consists in the features of construction, combinations of elements, and arrangement of parts which will be exemplified in the structure hereinafter described, and the scope of the application of which will be indicated in the following claims.

In the accompanying drawing in which are shown the mechanical features of one of various possible embodiments of this invention, Figure 1 is a perspective view of a temple bar shown attached to an eyeglass frame, certain parts being indicated in phantom and certain others in section in order to show the construction more clearly;

Similar reference characters refer to similar parts throughout the several views of the drawing.

Figure 1:
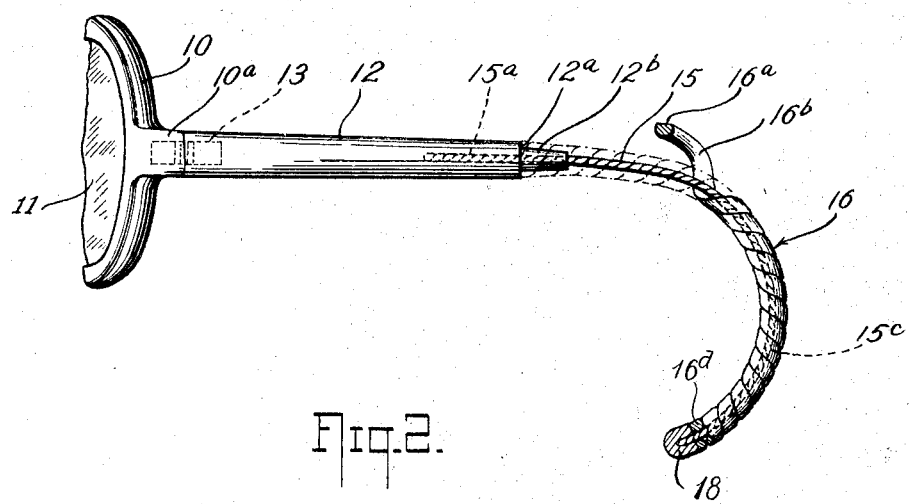

Referring now to Fig. 1 of the drawings, there is shown at 10 a fragmentary portion of a non-metallic or celluloid eyeglass frame supporting in any suitable manner the usual lenses, one of which, 11, is fragmentarily shown in relation to the main frame 10. At this point it might be noted that the term "celluloid" is used in a broad sense throughout to comprehend various non-metallic substances of substantially similar nature and adapted to form eyeglass frames and associated parts. The eyeglass frame 10 is provided at its lateral portion with an extension $10^a$ in order to facilitate the connection of the temple bar to the frame 10. Thus, in Fig. 1 there is shown a member 12 of celluloid forming the main body portion of the temple bar, the member 12 being secured at its front end to the extension $10^a$ of the main frame 10 in any suitable manner, as for example by means of the hidden hinge diagrammatically indicated at 13.

Figure 2:
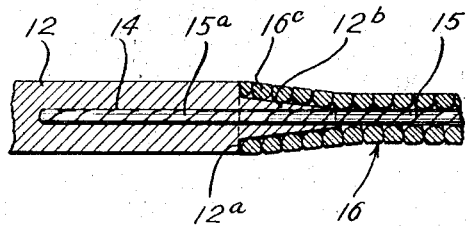
Figure 2 is an enlarged sectional view taken longitudinally of the temple bar and through substantially the middle portion thereof.

The main body portion 12 may be, for example, of substantially circular cross section and at its end opposite its connection with the main frame 10 the main body portion 12 of celluloid is provided with a longitudinally extending and substantially centrally positioned recess, shown more clearly in Fig. 2 and indicated generally at 14. The recess 14 may be formed in any suitable manner, as for example by drilling.

Within the recess 14 and from the rear end of the main body portion 12 is inserted one end $15^a$ of a metallic extension 15 taking the form of a wire of less diameter than the thickness of the main body portion 12. The metallic extension 15, thus extending rearwardly of the main body portion 12, is preferably flexible and accordingly preferably takes the form of a spirally wound wire member, as is indicated in the drawing, whereby the desired degree of flexibility may be attained. Where, as in the preferred form, the metallic extension 15 is a spirally wound wire member, the recess 14 in the member 12 is drilled to a diameter slightly less than the normal diameter of the extension 15. The end portion $15^a$ thereof is thereupon inserted in the recess 14 with a twisting movement, the latter being made in such manner that the spirally wound extension 15 tends to be more tightly wound as it is thus forced into the recess 14, thereby slightly reducing its diameter to permit a ready entry of the end portion $15^a$ into the recess 14. After having inserted the end portion $15^a$ to the desired degree the cessation of the twisting action imposed thereon permits the spirally wound member to tend to assume its normal diameter, and the thus resulting expansion thereof makes certain the positive interlocking of the end portion 15ª of the extension 15 with the walls of the recess 14.

The extreme rear end portion of the celluloid member is preferably somewhat reduced in diameter to provide a shoulder 12ª, whereas the remaining portion 12ᵇ is gradually tapered in the direction toward the extreme end of the member 12 down to substantially the diameter of the metallic extension 15.

Referring to Fig. 1, it will be seen that the metallic extension 15 is suitably curved or bent at its end portion 15ᶜ to conform substantally to the contour of the back of the ear in order thus to form the ear-piece for the temple bar. A celluloid strip or ribbon preferably having a cross section determined substantially by a straight line to form a substantially flat face 16ª therefor and by a curved line to form an opposite curved face 16ᵇ therefor and by a curved line to form an opposite curved face 16ᵇ is thereupon formed in any suitable manner, and after being softened to a suitable degree, as by immersion in a suitable solvent solution, for example, is wound spirally upon the metallic extension 15, as shown in Fig. 1, the extension 15 thus forming a suitable core for the ribbon 16. Preferably, however, the ribbon 16, after being formed and softened as above described, is wound upon a suitable mandrel of substantially the same diameter as the metal extension or core 15 and is thereupon slipped over the extension 15 thus interlocked with the main celluloid body portion 12 of the temple bar.

Figure 3:
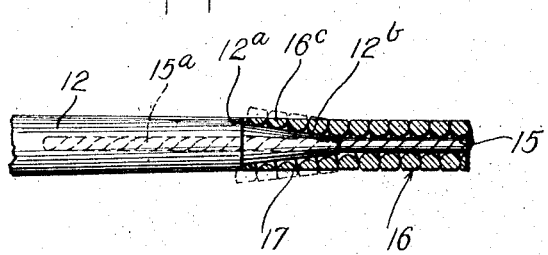
Figure 3 is a sectional view similar to Fig. 2 but showing a modified form of construction.

The one end, indicated at 16ᶜ in Fig. 2 adjacent the main body portion 12, is wound upon or surrounds the tapered end portion 12ᵇ of the member 12, as is clearly shown in Fig. 2, thus merging the somewhat enlarged contour of the main body portion 12 gradually into the somewhat reduced contour of the celluloid surrounding the core 15. These parts are thereupon heated to a suitable degree and worked, as by hand, for example, to cause the contacting faces and edges of the end 16ᶜ of the ribbon to flow or merge into the celluloid faces or edges of the shoulder 12ª and of the tapered portion 12ᵇ, thus securely connecting the ribbon 16 to the main celluloid body portion 12. This interconnection may, however, also be made as by cementing. Or, as is illustrated in Fig. 3, in which the tapered end portion 12ᵇ is of slightly greater dimensions than that illustrated in Fig. 2, I may wind the end 16ᶜ of the ribbon 16 upon the tapered end portion 12ᵇ or suitably surround the latter therewith, and after cementing or otherwise securing the end 16ᶜ to the end portions of the celluloid member 12 I may remove the surplus material of the ribbon end by cutting the projecting parts (shown in dotted lines in Figure 3) away, as, for example, along the full line 17, thereby gradually merging the flexible ear-piece member into the main body portion 12.

The core member 15 is thus made relatively rigid throughout a part thereof adjacent the rear end of the main body portion 12 with respect to the remaining rearwardly extending portion thereof, it being noted that this is preferably and conveniently effected by the stiffening action thereon of the tapered end portion 12ᵇ. Too easy flexing of the coiled celluloid extension 16 adjacent its immediate connection with the main body portion 12, together with the resultant tendency to break the connection, is thus effectively avoided.

Referring now to Fig. 1, it will be seen that the other end of the ribbon 16, indicated at 16ᵈ, is preferably terminated a short distance from the extreme end of the core or extension 15. Upon this projecting end portion of the core 15 there is then mounted as by cementing a celluloid cap member 18 of substantially the same outside diameter as that of the wound ribbon 16. There is thus provided not only an anchorage for the extreme end of the ribbon 16 but also a terminus for the ear-piece of conveniently rounded contour.

Figure 4:
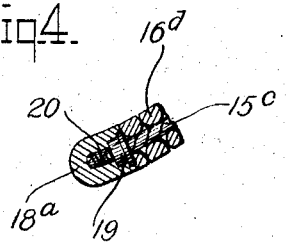
Figure 4 is a sectional view on an enlarged scale of a modified form of construction for the extreme end of the ear-piece.

In Fig. 4 I have illustrated a modified form of end construction for the ear-piece and it will be seen that I have mounted upon the projecting end of the metallic extension or core 15 a metallic member 19 suitably secured thereto in order to maintain the several parts in assembled relation. The member 19 may conveniently take the form of a nut and for this purpose I prefer to thread the extreme end of the metallic extension 15, as indicated at 20. Upon the metallic end construction thus provided there is then mounted a celluloid cap 18ª, suitably cemented thereto and thus forming a terminus for the ear-piece not only conducive to the comfort of the wearer but also of neat appearance.

In winding the ribbon 16 it will be seen that the ribbon is wound with the curved face 16ᵇ thereof upon the inside of the spiral so that the curved face 16ᵇ contacts with the core 15, leaving the flat face 16ª to form a substantially continuous and substantially smooth exterior for the curved ear-piece. The curved inner faces of the convolutions of the ribbon 16 permit the ready flexing of the ribbon 16 with the flexible core 15 without disturbing the alignment on the exterior of the outer flat faces 16ª of the consecutive convolutions. The assembled curved ear-piece is on the whole of great flexibility and permits the ready and convenient application or removal of the eyeglass frame. Moreover, the curved ear-piece construction is flexible enough, and yet sufficiently rigid, to adapt itself to the curvature of the back of the ear and is thus conducive to great comfort and relieves the ear from discomforting pressures while insuring the maintenance of the eyeglass frame in place. It may, moreover, be noted that in shaping the cross section of the ribbon as above described the ready flexing of the assembled ear-piece is facilitated in that the adjacent or contiguous convolutions thereof in effect act to roll upon each other as the flexing thereof takes place.

It will thus be seen that there has been provided in this invention a simple and practical temple bar construction in which the several objects hereinabove set forth as well as many advantages are attained. It will be seen, moreover, that the temple bar thus provided is of durable and rugged construction; is of convenient application when in use; and, moreover, the ear-piece thereof readily adjusts itself to the desired curvature of the back of the ear while securely holding the frames in place. It will also be seen that the temple bar is conducive to great comfort to the wearer when in use and that all these advantages are attained without detrimentally affecting the neat and all-celluloid appearance thereof.

As many possible embodiments may be made of the above invention and as many changes might be made in the embodiment above set forth, all without departing from the scope of the invention, it is to be understood that all matter herein set forth or shown in the accompanying drawing is to be interpreted as illustrative and not in a limiting sense.

I claim as my invention:

1. In eyeglass construction, a temple bar having a main body portion of celluloid, a coiled metallic extension secured thereto and extending rearwardly thereof, and a coiled celluloid extension surrounding said coiled metallic extension.

2. In eyeglass construction, a temple bar having a main body portion of celluloid provided with means at one end thereof for securing said main body portion to an eyeglass frame, and means forming a flexible ear-piece comprising a coiled non-metallic member and a metallic member extended through the coils of said non-metallic member and into the other end of said main body portion.

3. In eyeglass construction, a temple bar having a main body portion of celluloid and provided with means at its front end for securing said main body portion to an eyeglass frame, coiled non-metallic means terminating at the rear end of said main body portion and forming a flexible rearward extension therefor, and a coiled core member extending through said coiled non-metallic means and connected with the rear end of said main body portion for aligning the forward end of said coiled non-metallic means with the rear end of said main body portion, said core member being curved throughout its rear portion to reinforce said coiled non-metallic means in curved shape to form an ear-piece.

4. In eyeglass construction, a temple bar having a main body portion of celluloid and provided with means at its forward end for securing said main body portion to an eyeglass frame, a coiled non-metallic extension terminating at the rear end of said main body portion, and means extended through said coiled non-metallic extension and having a part extended into the rear end of said main body portion forming a core for said coiled extension, said core means being relatively rigid throughout a portion thereof adjacent the rear end of said main body portion and being flexible throughout substantially the remainder of its rearwardly extended portion.

5. In eyeglass construction, a temple bar having a main body portion of celluloid provided with means at its front end for securing said main body portion to an eyeglass frame, a metallic extension for said main body portion extending rearwardly thereof and of less diameter than said main body portion, an abutment at the extreme rearward end of said extension having a diameter substantially equal to that of said main body portion, and coiled non-metallic means of substantially the same outside diameter as that of said main body portion surrounding said metallic extension and interposed between the rear end thereof and said abutment.

6. In eyeglass construction, a temple bar having a main body portion of celluloid, means for securing said main body portion at one end thereof to an eyeglass frame, a metallic member extending rearwardly from the other end of said main body portion, and non-metallic means surrounding said metallic extension member.

7. In eyeglass construction, a temple bar having a main body portion of celluloid, a flexible metallic extension secured thereto and extending rearwardly thereof and non-metallic means about said metallic extension and adapted to be flexed therewith.

8. In eyeglass construction, a temple bar having a main body portion of celluloid, a flexible metallic extension secured to said main body portion, and non-metallic means forming a series of contiguous convolutions about said metallic member.

9. In eyeglass construction, a temple bar having a main body portion of celluloid, means at the front end of said main body portion for securing the latter to an eyeglass frame, a flexible metallic extension secured to said main body portion and extending rearwardly thereof, and non-metallic means covering said metallic member and encircling said member a plurality of times.

10. In eyeglass construction, a temple bar having a main body portion of celluloid provided with a recess extending into the rear end thereof and having means at the front end thereof for securing said main body portion to an eyeglass frame, a metallic extension for said celluloid body portion having one end adapted to be received within said recess, means for anchoring said metallic extension in said recess, and flexible non-metallic means about said metallic extension.

11. In eyeglass construction, a temple bar having a main body portion of celluloid provided with a recess at one end thereof, a metallic extension having one end adapted to be received within said recess and formed to interlock with the walls thereof, and a non-metallic covering for said metallic extension, one end of said covering being secured to said main body portion.

12. In eyeglass construction, a temple bar having a main body portion of celluloid, a metallic extension secured to said main body portion, and a spirally wound celluloid member surrounding said metallic extension, said member being secured at one end to said main body portion and at the other end to one end of said metallic extension.

13. In eyeglass construction, a temple bar comprising a main body portion of celluloid having a curved metallic extension secured thereto and at one end thereof to form an ear-piece, and means formed of celluloid forming a covering for said metallic extension and encircling said extension a plurality of times.

14. In eyeglass construction, a temple bar comprising a main body portion of celluloid, a metallic extension secured thereto, said extension being curved to form an ear-piece, and a celluloid member having a cross section determined substantially by a straight line and a curved line wound spirally about said metallic extension with the curved portion thereof adjacent said metallic extension.

In testimony whereof I have signed my name to this specification this twenty-second day of November, A. D. 1922.

STEPHEN J. CLULEE.